United States Patent
Yamamoto et al.

(10) Patent No.: US 7,191,970 B2
(45) Date of Patent: Mar. 20, 2007

(54) MAGNETIC TAPE CARTRIDGE

(75) Inventors: Hidetoshi Yamamoto, Kanagawa (JP); Seiji Tsuyuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/372,022

(22) Filed: Mar. 10, 2006

(65) Prior Publication Data

US 2006/0231660 A1    Oct. 19, 2006

(30) Foreign Application Priority Data

Mar. 11, 2005    (JP)    ............................. 2005-068358

(51) Int. Cl.
*G11B 23/07*    (2006.01)

(52) U.S. Cl. .................. 242/338.1; 242/343; 242/344; 242/348; 360/132

(58) Field of Classification Search ................ 242/338, 242/338.1, 343, 344, 348, 912; 360/132
See application file for complete search history.

(56) References Cited

U.S. PATENT DOCUMENTS

| | | | |
|---|---|---|---|
| 7,100,857 B2* | 9/2006 | Ishihara et al. ........... | 242/338.1 |
| 7,108,215 B2* | 9/2006 | Fukuda .................... | 242/338.1 |
| 7,124,973 B2* | 10/2006 | Hiraguchi ................ | 242/338.1 |
| 2003/0057309 A1* | 3/2003 | Tsuyuki et al. .......... | 242/338.1 |
| 2004/0232266 A1* | 11/2004 | Hiraguchi ................ | 242/338.1 |
| 2004/0262437 A1* | 12/2004 | Hiraguchi et al. ....... | 242/338.1 |

FOREIGN PATENT DOCUMENTS

JP    2003-85930 A    3/2003

* cited by examiner

*Primary Examiner*—William A. Rivera
(74) *Attorney, Agent, or Firm*—Sughrue Mion, PLLC (57) ABSTRACT

The present invention aims to provide a magnetic tape cartridge capable of improving operational precision and efficiency in the process of mounting a release part for unlocking a reel.

A magnetic tape cartridge having a release button (part) for unlocking a reel, the release button being mounted in a hub with a cup shape formed on the reel, wherein a bottom portion of the hub has a fitting opening into which the release part fits, and a detection opening with a predetermined positional relationship with the fitting opening; and a reflection (metal) plate attached on a bottom surface of the bottom portion of the hub is viewed from an aperture of the detection opening defined in a top surface of the bottom portion of the hub.

20 Claims, 8 Drawing Sheets

A-A SECTIONAL VIEW

MAGNETIC TAPE CARTRIDGE

BACKGROUND OF THE INVENTION

1. Field of the Invention

The present invention relates to a magnetic tape cartridge, and more particularly to a magnetic tape cartridge that improves operation accuracy and efficiency in the process of installing a release part for unlocking a reel.

2. Description of the Related Art

Figure 6:
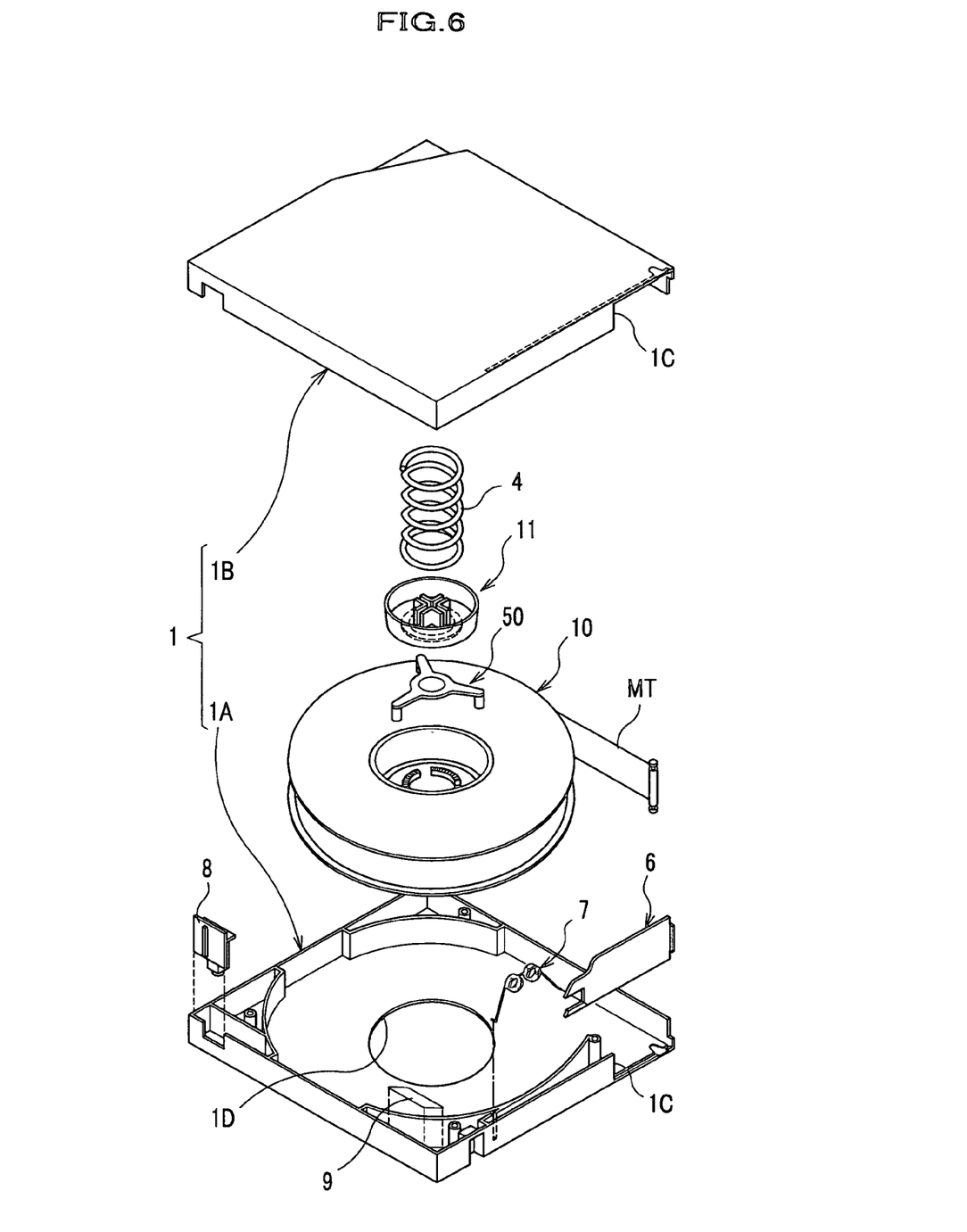
FIG. 6 is a disintegrated perspective view showing components of a conventional magnetic tape cartridge.

As a magnetic tape cartridge used as an external recording media for data backup for computers, for example, that complying with the LTO (Linear Tape Open) standard is conventionally known. As shown in FIG. 6, this type of magnetic tape cartridge is constructed by a cartridge case divided to a lower half 1A and an upper half 1B, the cartridge case including: a single reel 10 having a magnetic tape MT wound therearound; a locking plate 11 and a pressure coil spring 4 for locking the rotation of the reel 10; a release pad 50 for unlocking the reel 10; a sliding door 6 for opening and closing a magnetic tape outlet 1C defined in the cartridge case 1 across the lower half 1A and the upper half 1B; a coil spring 7 for biasing the sliding door 6 to close the magnetic tape outlet 1C; a write protect tab 8; and a cartridge memory 9.

Figure 7:
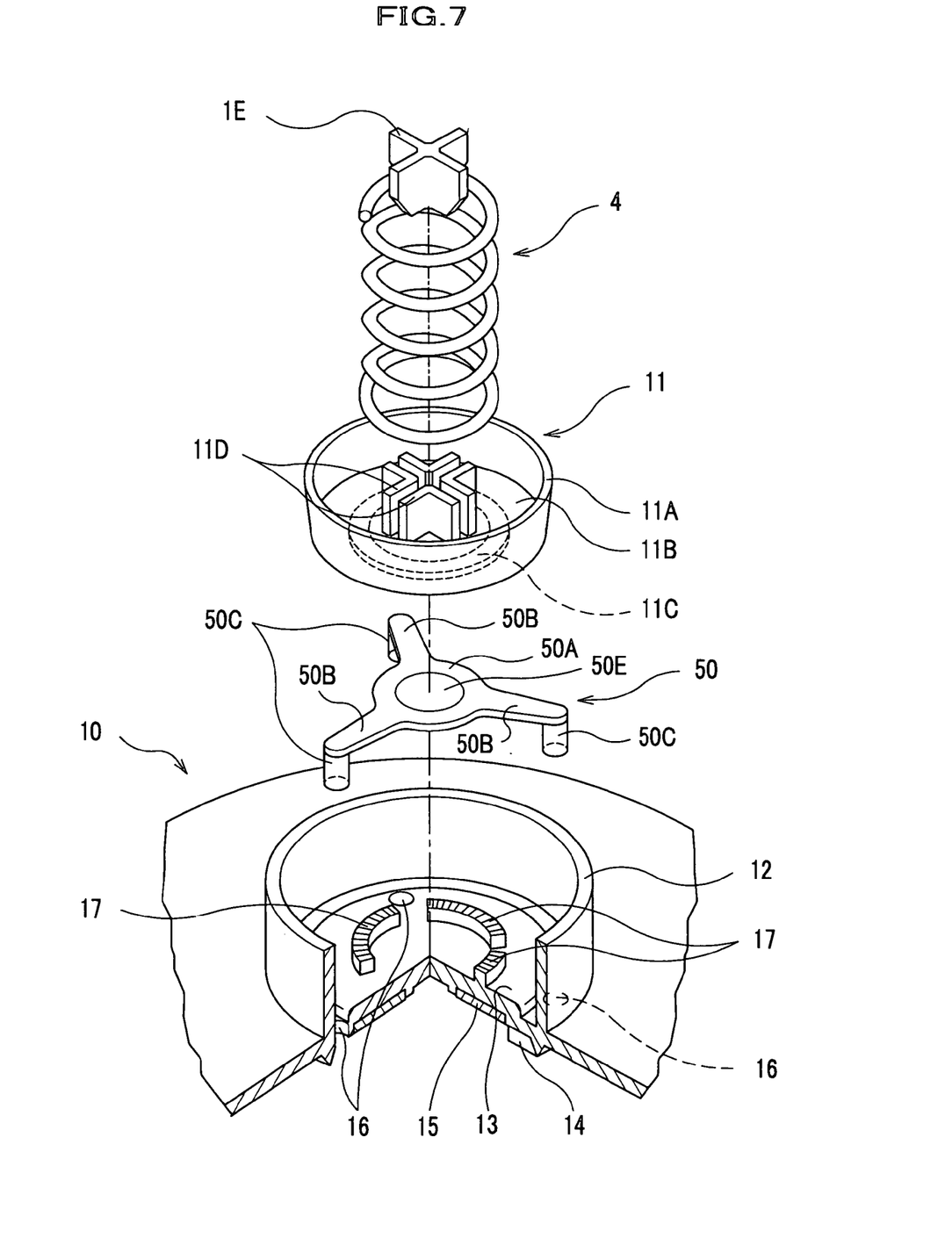
FIG. 7 is a perspective view showing components for locking a reel in a conventional magnetic tape cartridge.

As shown in FIG. 7, the reel 10 has at its center a hub 12 with a cup shape opening in the side of the upper half 1B (see FIG. 6). Inside the hub 12, the release pad 50, the locking plate 11, and the pressure coil spring 4 are incorporated. The bottom surface of a bottom portion 13 of the hub 12 is externally exposed from a circular opening 1D (see FIG. 6) defined at the center of the lower half 1A. On the periphery of the bottom surface of the bottom portion 13, a face gear 14 is formed which engages with a face gear formed on a spindle of a drive unit (not shown) on which the cartridge is mounted, in order to rotate the reel 10.

Inside the face gear 14, a metal plate 15 which is attracted by a magnet provided on the spindle of the drive unit (not shown) is attached.

On the bottom portion 13, three circular openings 16 are penetratingly provided in up/down direction. These openings 16 are arranged at equal intervals in the proximity of the inner perimeter surface of the hub 12, along a circumference arranged with a predetermined radius complying with the LTO standard, and each have an aperture in the width of the face gear 14. Further, at predetermined positions inner than the openings 16, three engaging portions 17 are provided in an upwardly protruding manner.

The locking plate 11 has a plate body 11A with a cup shape that can be housed in the hub 12 of the reel 10. At a predetermined position on a bottom surface of a bottom portion 11B of the plate body 11A, a hub-side engaging portion 11C is formed which is capable of detachably engaging with the engaging portions 17 of the reel 10.

The locking plate 11 has, at the center of the top surface of the plate body 11A, four half-side engaging portions 11D provided in an upwardly protruding manner, which is in full-time engagement with a protrusion 1E with a cross shape provided at the center of the inner surface of the upper half 1B (see FIG. 6).

The locking plate 11 is downwardly biased by the pressure coil spring 4 externally attached to the half-side engaging portions 11D and provided between the locking plate 11 and the upper half 1B, and consequently the hub-side engaging portion 11C disengageably engages with the engaging portions 17.

The release pad 50 has a pad main body 50A with a disc shape from which three arm portions 50B extend in three directions at equal intervals. The arm portions 50B each have an unlocking pin 50C with a columnar shape downwardly extending from the tip thereof.

The arm portions 50B are each located between the engaging portions 17 provided on the bottom portion 13, with the unlocking pins 50C introduced through the openings 16 in the bottom portion 13.

At the center of the pad main body 50a, a spherical protrusion 11E is formed which engages with a spherical dent (not shown) provided at the center of the bottom surface of the bottom portion 11B.

Thus, in such magnetic tape cartridge, biasing force of the pressure coil spring 4 provided between the upper half 1B and the locking plate 11 causes the hub-side engaging portion 11C to engage with the engaging portions 17 protrudingly provided on the top surface of the bottom portion 13 of the hub 12 of the reel 10, thereby maintaining the reel 10 in a locked state.

Further, when the magnetic tape cartridge is mounted in the drive unit (not shown) and the hub 12 is rotated by a spindle of the unit, a face gear formed at the top of the spindle presses the unlocking pins 50C toward the upper half 1B (see FIG. 6), causing the locking plate 11 to move toward the upper half 11B against the pressure coil spring 4. This causes the hub-side engaging portion 11C to disengage from the engaging parts 17, thus unlocking the reel 10.

In the process of mounting the release pad 50 to the hub 12, of the assembling processes of the magnetic tape cartridge thus constructed, first the lower half 1A (see FIG. 6) to which those parts such as the reel 10 are attached and set on a parts conveying pallet (not shown), is conveyed by a belt conveyor. The lower half 1A comes to a stop on reaching a predetermined position near a robot (not shown).

Figure 8:
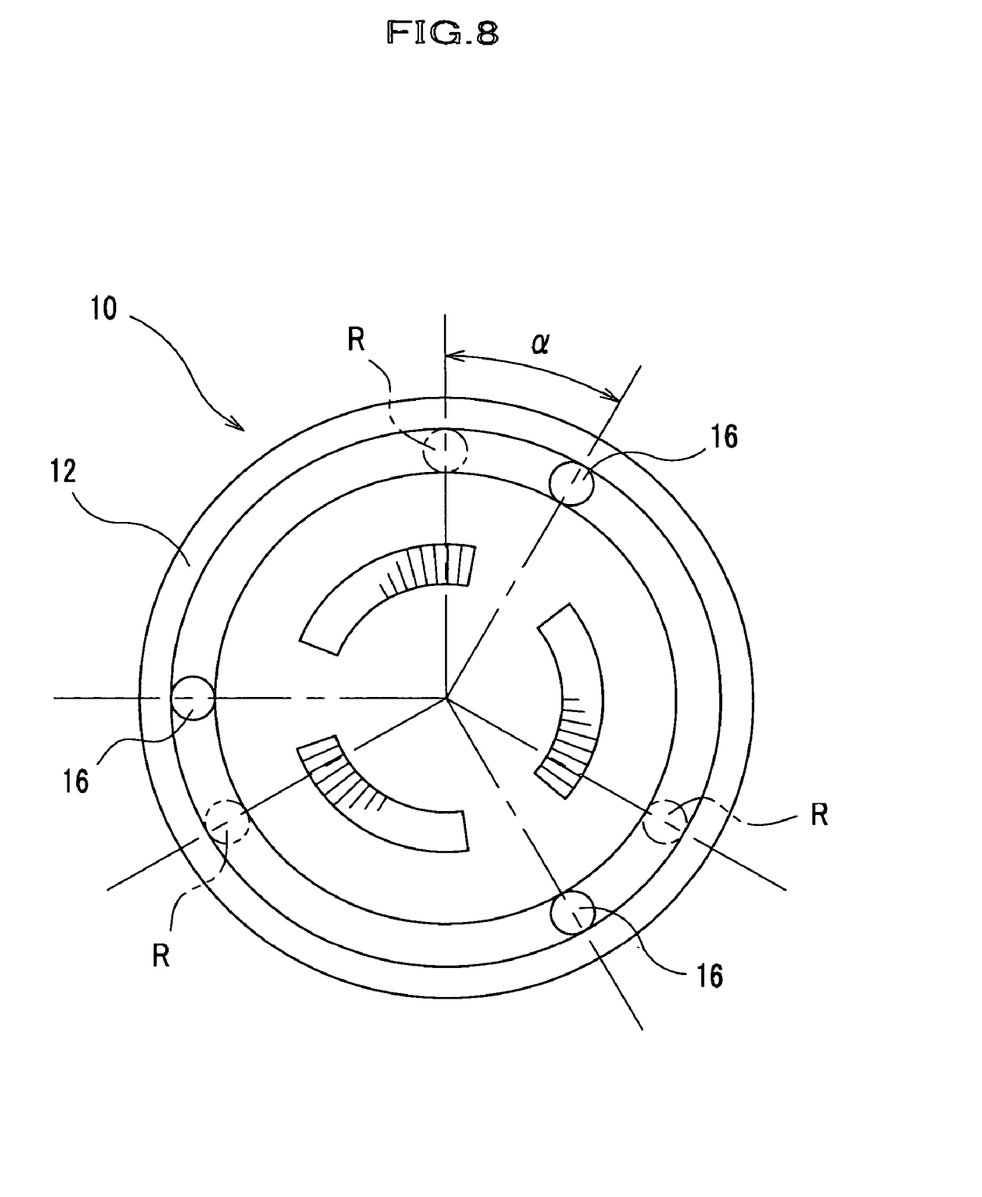
FIG. 8 is a plan view showing the inside of a hub of a reel in a conventional magnetic tape cartridge.

An image processing camera (not shown) provided above the position photographs the openings 16 on the bottom portion 13 in the hub 12 of the reel 10 as shown in FIG. 8. Then, an image processor (not shown) detects the centers of the openings 16.

On the basis of the centers, the processor computes an angle α deviated, for example, in a clockwise direction from normal positions R. In order to correct the deviation of angle α, an apparatus provided below the belt conveyor (not shown) rotates the reel 10 by the angle α to align the openings 16 with the normal positions R.

Into the hub 12 on the reel 10 thus aligned, the robot holds and inserts the release pad 50 prealigned as shown in FIG. 7 and placed on the parts conveying pallet. The unlocking pins 50C are inserted into the openings 16 aligned with the normal positions R, and therewith the process of mounting the release pad 50 into the hub 12 completes. See Japanese Patent Application Laid-Open (Kokai) No. 2003-85930 (FIGS. 12–14), for example.

However, when the camera photographs the openings 16 in the process of mounting the release pad 50, the openings 16 become dark inside because the reel 10 is placed on the belt conveyor. This makes the openings 16 unclear on the photographed image, making it difficult for the image processor to precisely recognize the openings 16, which lead to a problem of decreased precision in the image processing for obtaining each center of the openings 16 and lengthened processing time.

Therefore, the present invention aims to solve the aforementioned problem, and to provide a magnetic tape cartridge capable of improving operation accuracy and efficiency in the process of mounting the release part for unlocking the reel into the hub.

SUMMARY OF THE INVENTION

In order to solve the above-mentioned problem, a first aspect of the invention provides a magnetic tape cartridge having a release part to be mounted in a hub, the release part unlocking a reel having a magnetic tape wound therearound and to be housed in a cartridge case in a locked state, and the hub being formed on the reel and having a cup shape, wherein a bottom portion of the hub has a fitting opening defined therein into which the release part fits in a predetermined direction, and a detection opening penetrating therethrough with a predetermined positional relationship with the fitting opening; and wherein a reflection plate attached on the bottom surface of the bottom portion of the hub is viewed from an aperture of the detection opening defined in the top surface of the bottom portion of the hub.

Thus, the reel of the magnetic tape cartridge according to the invention has the detection opening with a predetermined positional relationship with the fitting opening to which the release part fits. In the process of mounting the release part, the position of the detection opening is detected by means of the photographing process, and is used as the basis for detecting the position and direction of the fitting opening. Thus, it becomes possible to calculate the deviation of the fitting opening with respect to the supplied release part.

Further, in the present invention, the reflection plate attached on the bottom surface of the bottom portion of the hub is viewed from the aperture of the detection opening defined on the top surface of the bottom portion of the hub. Therefore, when the inside of the hub is photographed, the irradiated light reflects on the reflection plate, thus brightly photographing inside of the detection opening. Accordingly, the detection opening is clearly shown on the photographed image, which allows accurate detection of the position of the detection opening by means of image processing as well as reduced processing time.

A second aspect of the invention provides a magnetic tape cartridge as set forth in the first aspect of the present invention, wherein a rib is protrudingly provided to a side surface of the release part, and the fitting opening has a rib groove to which the rib of the release part fits; and the detection opening is defined on an extension line of the rib groove.

Thus, according to the magnetic tape cartridge of the invention, the fitting opening has the rib groove to which the rib of the release part fits, and the detection opening is provided on the extension line of the rib groove. Therefore, in the process of mounting the release part, detecting the detection opening allows detection of the direction of the rib groove, and thus the direction of the fitting opening can be accurately detected.

A third aspect of the invention provides a magnetic tape cartridge as set forth in the first or second aspect of the present invention, wherein the reflection plate is a metal plate to be attracted by a magnet provided on a spindle of a drive unit when the magnetic tape cartridge is mounted in the drive unit.

The drive unit to which the magnetic tape cartridge is mounted is provided with the spindle for rotating the reel. When the reel is attracted to the spindle, the face gears of the reel and the spindle engage to each other, making the spindle rotate when the reel rotates. For this reason, in a conventional magnetic tape cartridge, a metal plate to be attracted to a magnet provided on the spindle is attached to the bottom surface of the bottom portion of the reel hub.

Thus, the magnetic tape cartridge according to the invention can use the basic structure of the conventional magnetic tape cartridge without a drastic modification thereof, because the metal plate to be attracted to the magnet provided to the spindle of the drive unit is also used as the reflection plate.

A fourth aspect of the invention provides a magnetic tape cartridge as set forth in any of the first to third aspects of the present invention, wherein the top surface of the bottom portion of the hub has a mark with a rougher surface than the surrounding of the mark.

On the top surface of the bottom portion 13, a mark is made by an extrusion pin of a mold when the injection molded reel 10 was extruded therefrom. At this time, if the surface of the mark is a smooth gloss surface, it may become difficult to distinguish the mark from the detection openings 40 since the mark is sharply imaged because of the reflection thereon when the inside of the hub 12 is photographed, in the process of attaching the release button 20.

In this manner, in the magnetic tape cartridge according to the present embodiment, because the mark has the rougher surface than its surrounding, the reflection on the mark can be considerably reduced and the mark is prevented from being sharply imaged when the inside of the hub is photographed. As a result, it becomes possible to clearly distinguish between the detection openings 40 and the mark on the photographed image.

Methods for making rough the surface of the mark provided on the top surface of the bottom portion of the hub include providing the surface with fine concavities and convexities by using a member such as the extrusion pin having a texturing-processed hitting surface.

A fifth aspect of the invention provides a magnetic tape cartridge as set forth in any of the first to third aspects of the invention, wherein a plurality of the detection openings are arranged on a circumferential line around the fitting opening, and the top surface of the bottom portion of the hub has a mark at a position out of the circumferential line.

Thus, in the magnetic tape cartridge according to the present embodiment, because the mark provided on the top surface of the bottom portion of the hub is out of the circumferential line on which the detection openings are located, it is possible to infallibly distinguish between the detection openings and the mark on the basis of the circumferential line, when the inside of the hub is photographed.

A sixth aspect of the invention provides a magnetic tape cartridge as set forth in any of the first to third aspects of the invention, wherein the top surface of the bottom portion of the hub has a mark with an area twice or more or half or less the cross sectional area of the detection opening.

Thus, in the magnetic tape cartridge according to the present embodiment, because the mark provided on the top surface of the bottom portion of the hub has an area twice or more or half or less the sectional area of the detection opening, it is possible to unfailingly distinguish between the detection openings and the mark on the basis of the area, when the inside of the hub is photographed.

A seventh aspect of the invention provides a magnetic tape cartridge as set forth in the second or third aspect of the invention, wherein the side surface of the release part has a plurality of ribs including first and second ribs, the first rib having a larger engaging area with the rib groove than the second rib, the second rib being thicker than the first rib and having a smaller engaging area with the rib groove than the first rib, and the first and second ribs being alternately provided along the circumferential direction of the side surface of the release part.

Thus, because the first rib has a larger area to engage with the rib groove than the second rib, it is possible to reduce the stress per unit area that the second rib may receive from the reel 10 in rotation, and to enhance the stability of the release part in motion guided by the fitting opening. Further, because of being shorter in up and down direction than the first rib, the second rib has a construction to eliminate the effect of the resin fluidity.

A eighth aspect of the invention provides a magnetic tape cartridge as set forth in the seventh aspect of the invention, wherein the release part has a columnar shape, and the first and second ribs are provided at intervals of 60 degrees along the circumferential surface of the release part.

As described above, such a magnetic tape cartridge has detection openings for detecting the position and direction of the reel on the bottom portion of the hub of the reel, such that the reflection plate attached on the bottom surface of the bottom of the hub can be viewed from the aperture of the detection opening. With this construction, in the process of mounting the release part, the light radiated to photograph the inside of the hub reflects on the reflection plate, and thereby the insides of the detection openings are brightly photographed and the openings brightly displayed on the photographed image. Accordingly, processing the image allows accurate detection of the position of the detection openings, shortened processing time, and increased operational precision and efficiency-in the process of mounting the release part.

DESCRIPTION OF THE PREFERRED EMBODIMENT

With reference to the drawings, an embodiment of the present invention will be descried in detail.

In the embodiment, a magnetic tape cartridge having a release button (or "release part" as used in claims) for unlocking a reel will be described as an example.

It is to be noted that in the description below, the same component as in the conventional magnetic tape cartridge as discussed in the Description of the Related Art (see FIGS. 6 and 7) is attached with the same symbol, and a redundant description will be partly omitted.

Figure 1:
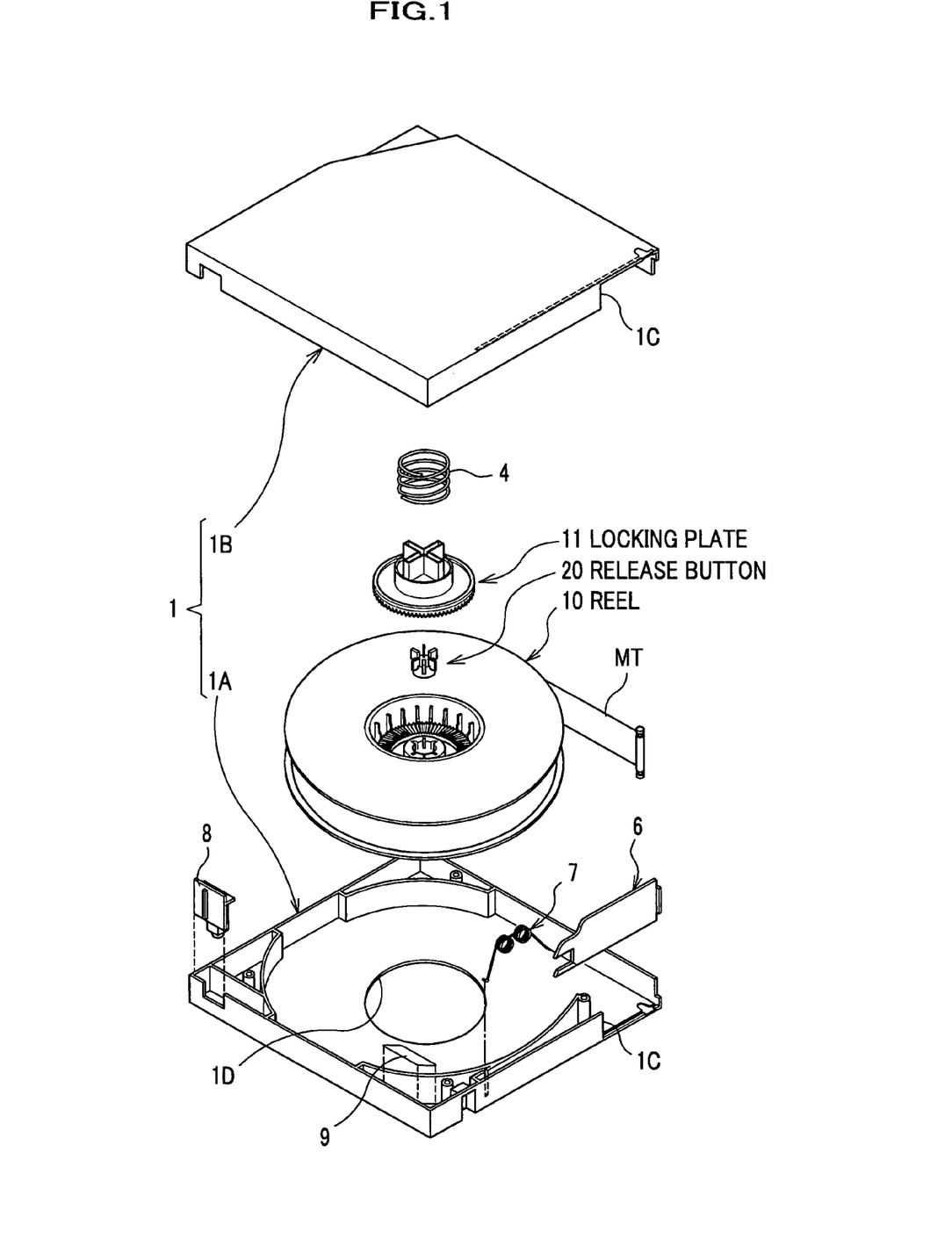
FIG. 1 is a disintegrated perspective view showing components of a magnetic tape cartridge according to the invention.

As shown in FIG. 1, the magnetic tape cartridge of the embodiment comprises a cartridge case 1 divided into a lower half 1A and an upper half 1B. The cartridge case 1 includes a single reel 10 having a magnetic tape MT wound therearound, a locking plate 11 and a pressure coil spring 4 for locking the rotation of the reel 10, and a release button 20 for unlocking the reel 10.

Figure 2:
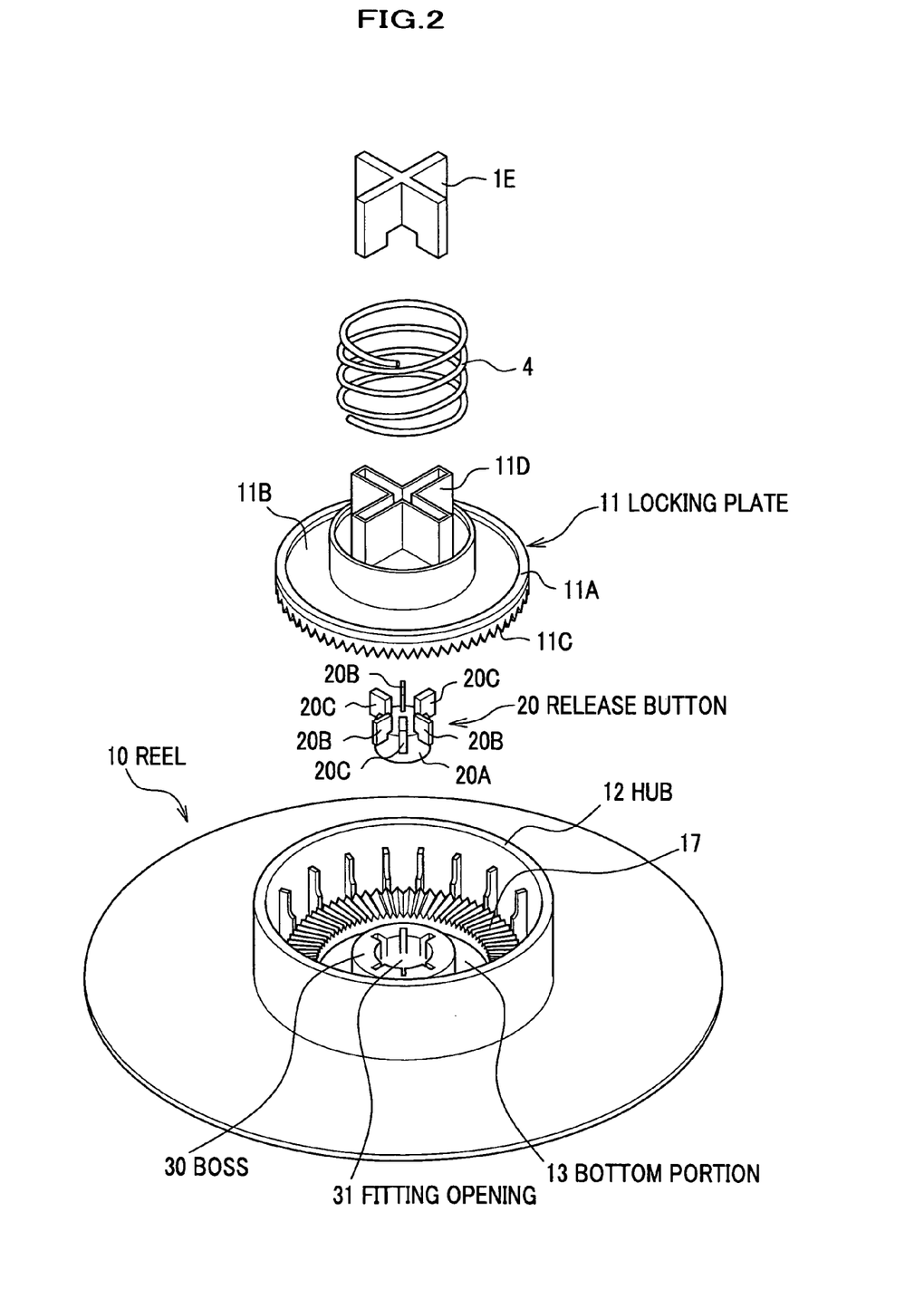
FIG. 2 is an upper perspective view of components for locking a reel in a magnetic tape cartridge according to the invention.
Figure 3:
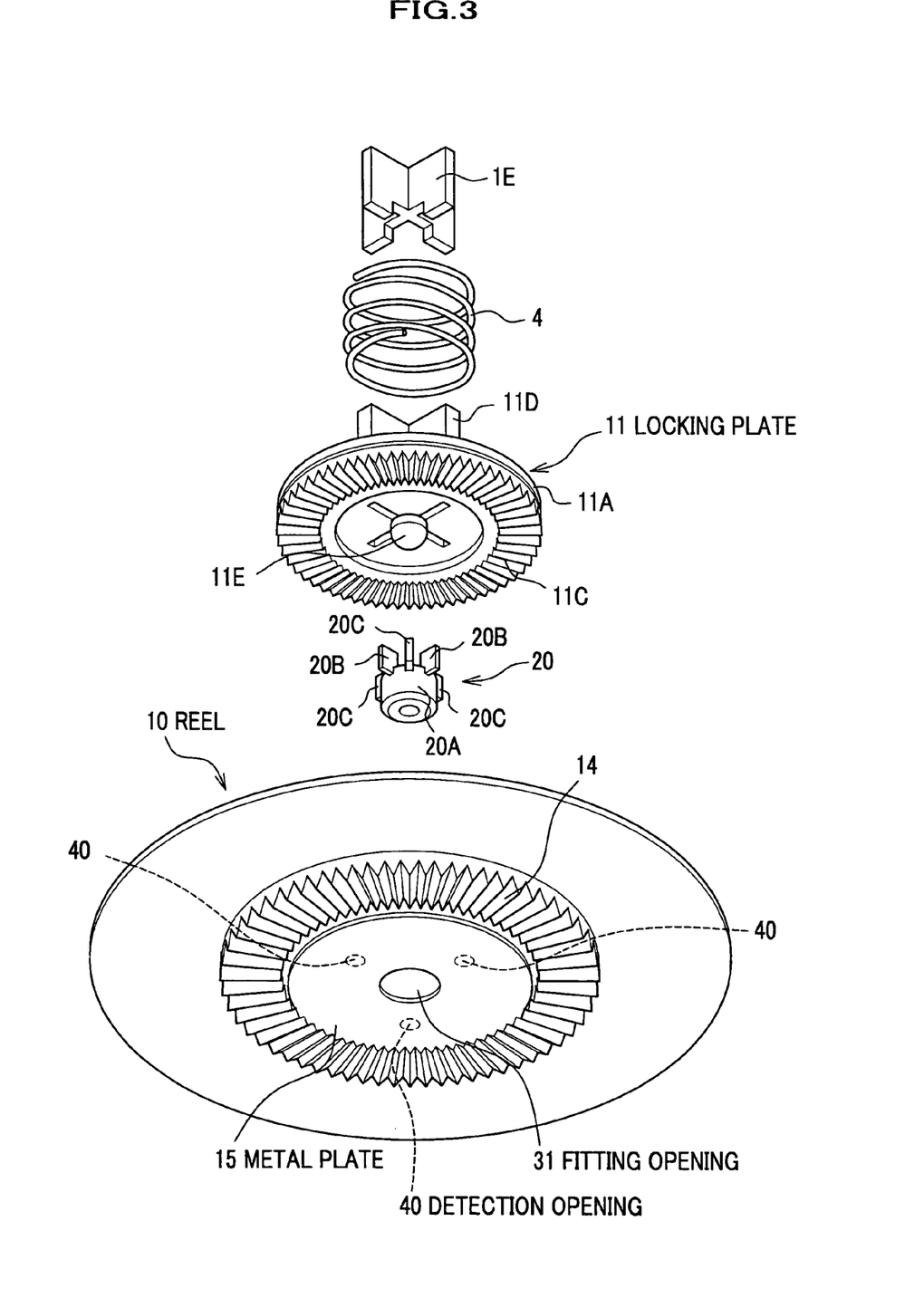
FIG. 3 is a lower perspective view of components for locking a reel in a magnetic tape cartridge according to the invention.

As shown in FIGS. 2 and 3, the reel 10 has at its center a hub 12 with a cup shape having an aperture on the side of the upper half 1B (see FIG. 1). In the hub 12, the release button 20, the locking plate 11, and the pressure coil spring 4 are mounted. The bottom surface of a bottom portion 13 of the hub 12 is externally exposed from a circular opening 1D provided at the center of the lower half 1A (see FIG. 1). The bottom surface has on its perimeter a face gear 14 engaging with a face gear formed on a spindle of a drive unit (not shown) to which the cartridge is to be loaded, to rotate the reel 10.

On the top surface of the bottom portion 13, an engaging portion 17 of a ring shape is formed along the inner peripheral of the hub 12. At the center of the top surface of the bottom portion 13, a columnar boss 30 is provided in an upwardly protruding manner. The boss 30 has a fitting opening 31 penetrating in up/down direction, into which the release button 20 is fitted.

On the bottom surface of the bottom portion 13 between the face gear 14 and the fitting opening 31, a metal plate 15 of a ring shape is attached which is attracted by a magnet provided on the spindle of the drive unit (not shown). The metal plate 15 is a reflection plate for reflecting irradiation light, and at lease the top surface thereof is reflective.

The locking plate 11 comprises a plate body 11A housable in the hub 12. On a predetermined position on the bottom surface of a bottom portion 11B of the locking plate 11, a hub-side engaging portion 11C detachably engaging with the engaging portion 17 is formed. The plate body 11A has, at the center of the top surface of the bottom portion 11B, a half-side engaging portion 11D provided in an upwardly protruding manner, which is in full-time engagement with a protrusion 1E with a cross shape protrudingly provided at the center of the inner face of the upper half 1B (see FIG. 1).

The locking plate 11 is downwardly biased by the pressure coil spring 4 externally attached to the half-side engaging portion 11D and provided between the locking plate 11 and the upper half 1B, so that the hub-side engaging portion 11C detachably engages with the engaging portion 17. At the center of the bottom surface of the bottom portion 11B, a spherical protrusion 11E is formed.

The release button 20 has a button body 20A with a columnar shape. On the lateral peripheral surface of the release button 20, six ribs 20B, 20C protruding in six directions at equal intervals are provided, the upper portion of the ribs 20B, 20C protruding from the top surface of the button body 20A. The release button 20 is produced by injection molding a resin material such as plastic.

Figure 4A:
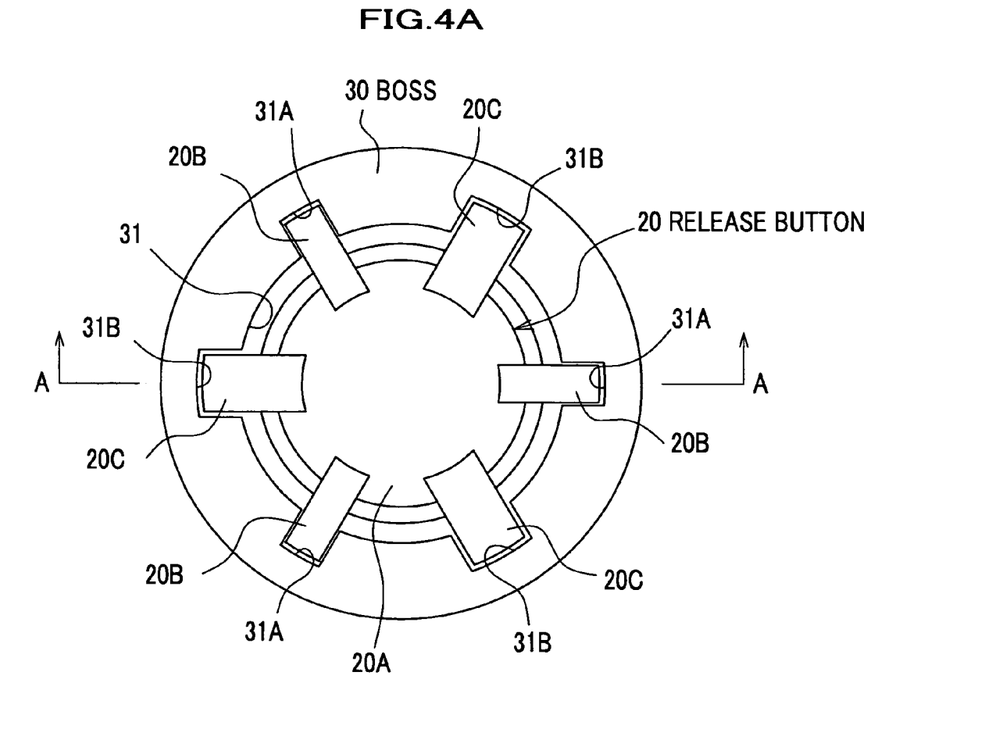
FIG. 4A is a plan view of a boss formed in a hub of a reel, having a release button mounted thereto, in a magnetic tape cartridge according to the invention.

As shown in FIG. 4, the three rotation restriction ribs 20B are formed at intervals of 120 degrees in the circumferential direction of the button body 20A, and the three height restriction ribs 20C are arranged therebetween at intervals of 120 degrees in the same direction.

As shown in FIGS. 2 and 3, the central portion on the top surface of the button body 20A is an area in which the spherical protrusion 50E formed on the bottom surface of the bottom portion 11B of the locking plate 11 is located. The spherical protrusion 50E is positioned between the ribs 20B, 20C.

As shown in FIG. 4, in the inner periphery of the fitting opening 31, three rotation restriction rib grooves 31A in which the rotation restriction ribs 20B fit are defined at intervals of 120 degrees in the circumferential direction of the opening. At three positions each between two of the rotation restriction rib grooves 31A, three height restriction rib grooves 31B to which the height restriction ribs 20C fit are provided at intervals of 120 degrees in the circumferential direction of the opening.

Thus, when the release button 20 is fitted in the fitting opening 31, the ribs 20B, 20C of the release button 20 respectively fit in the rib grooves 31A, 31B.

In such a magnetic tape cartridge, as shown in FIGS. 2 and 3, the biasing force of the pressure coil spring 4 provided between the upper half 1B (FIG. 1) and the locking plate 11 causes the hub-side engaging portion 11C on the bottom surface of the locking plate 11 to engage with the engaging portion 17 protrudingly provided on the top surface of the bottom portion 13 of the hub 12 of the reel 10. The engagement maintains the reel 10 in a locked state.

When the magnetic tape cartridge is mounted in the drive unit (not shown) the hub 12 is rotated by the spindle of the unit, in that the spindle attracts the metal plate 15 provided on the bottom surface of the bottom portion 13 of the hub 12 of the reel 10, thus causing the face gear 14 formed on the bottom surface of the bottom portion 13 of the hub 12 and the face gear provided on the spindle to engage to each other. Then, the release button 20 is pressed toward the upper half 1B (see FIG. 1) by a protrusion provided on the top surface of the spindle. This causes the locking plate 11 to move toward the upper half 1B against the pressure coil spring 4, disengaging the hub-side engaging portion 11C from the engaging portion 17 protrudingly provided on the top surface of the bottom surface 13 of the hub 12 of the reel 10, and thus unlocking the reel 10.

Figure 4B:
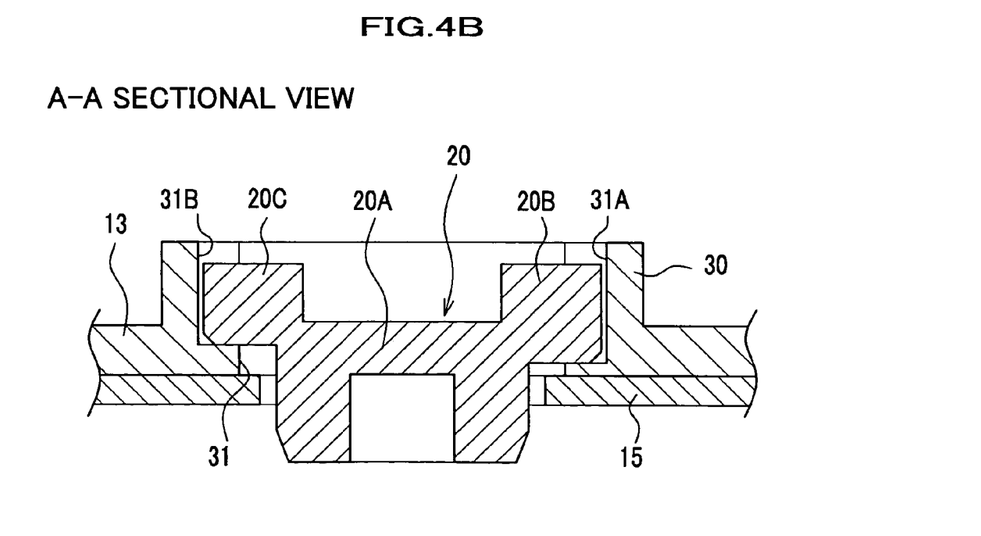
FIG. 4B is a cross-sectional view taken along the line A—A in FIG. 4A.

Here, as shown in FIG. 4B, the rotation restriction rib 20B and the height restriction rib 20C have the same height of the top surface, while the rotation restriction rib 20B has a lower bottom surface than the height restriction rib 20C. Accordingly, the bottom surface of the rotation restriction groove 31A provided in the boss 30 is lower than that of the height restriction rib groove 31B, corresponding to the heights of the ribs 20B, 20C, respectively.

The rotation restriction rib 20B thus has a larger engaging area with the boss 30 than the height restriction rib 20C. This allows a reduction in the stress per unit area received by the rotation restriction rib 20B from the reel 10 in rotation, and an increase in the stability of the release button 20 in motion when being introduced by the fitting opening 31.

The rotation restriction rib 20B restricts a wobbling motion of the release button 20 with respect to the fitting opening 31. Effective restriction of this motion requires narrowing the gap in the circumferential direction of the boss 30 between the rotation restriction rib 20B and the rotation restriction rib groove 31A. For this purpose, the rib 20B has an increased dimensional accuracy in injection molding by narrowing the width of the button body 20A in the circumferential direction to the extent not causing a strength problem.

In contrast, the height restriction rib 20C is thicker in the circumferential direction of the boss 30 than the rotation restriction rib 20B. This assures the height restriction rib 20C of a sufficient rigidity against the biasing force of the pressure coil spring 4 applied thereto through the locking plate 11. Though having a reduced resin fluidity in injection molding because of being thick in the circumferential direction of the boss 30, the height restriction rib 20C has a construction to eliminate the effect of the resin fluidity, because of being shorter in up and down direction than the rotation restriction rib 20B. Although the thickness of the height restriction rib 20C in the circumferential direction of the boss 30 reduces resin fluidity in injection molding, the smaller length in up and down direction than the rotation restriction rib 20B provides a construction to eliminate the effect of resin fluidity. Because such a height restriction rib 20C has a low dimensional accuracy in injection molding, the gap in the circumferential direction of the boss 30 between the height restriction rib 20C and the height restriction rib groove 31B is set to be wider than the gap between the rotation restriction rib 20B and the rotation restriction grooves 31A.

Figure 5:
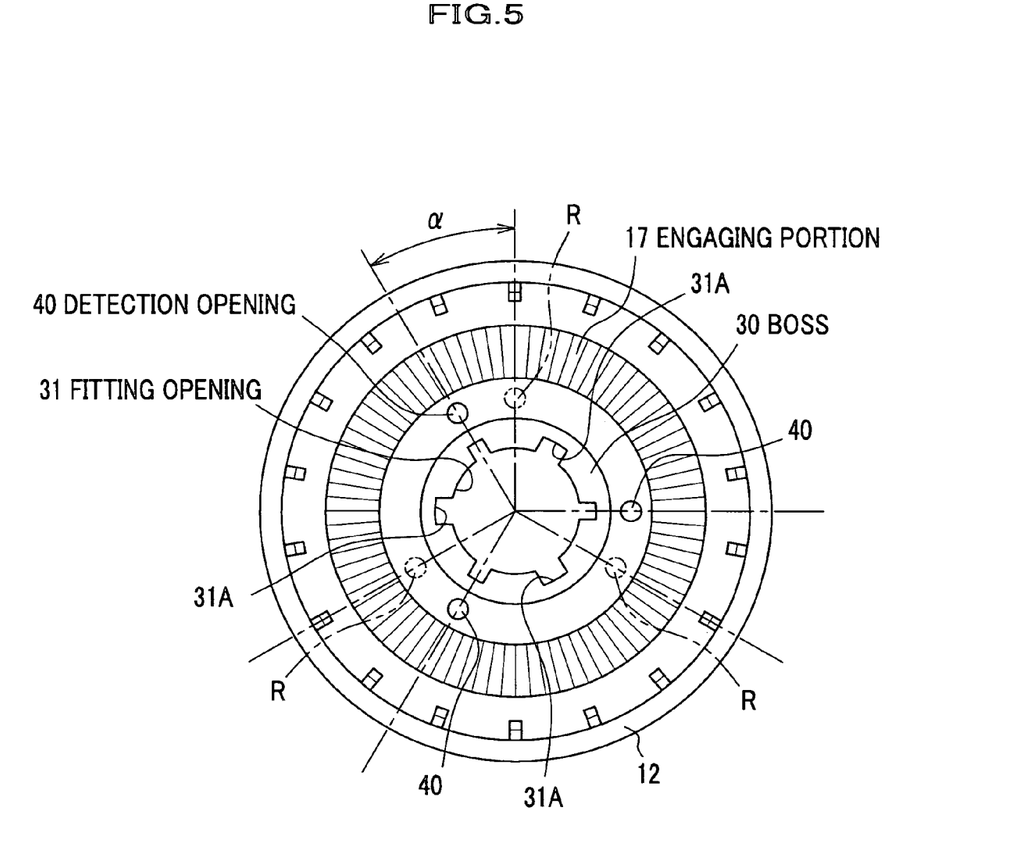
FIG. 5 is a plan view showing the inside of a hub of a reel in a magnetic tape cartridge of the present embodiment.

As shown in FIG. 5, between the engaging portion 17 and the boss 30 on the bottom portion 13 of the hub 12 of the reel 10, circular detection openings 40 are defined in an up and down direction at three positions each located on each extension line of the rotation restriction ribs 31A. These detection openings 40 have a predetermined positional relationship with the fitting opening 31, being located on the extension lines of the rotation restriction ribs 31A and arranged at intervals of 120 degrees in the circumferential direction of the reel 10.

From the apertures of the detection openings 40, the top surface of the metal plate 15 (see FIG. 3) attached on the bottom surface of the bottom portion 13 of the hub 12 can be viewed.

In the process of mounting the release button 20 to the hub 12, of the assembly processes of the magnetic tape cartridge thus configured, the lower half 1A including parts such as the reel 10 mounted thereto is placed on a conveying pallet (not shown) and conveyed by a belt conveyor. The lower half 1A comes to a stop on reaching a predetermined position near a robot (not shown). An image processing camera provided above the position photographs the openings 16 as shown in FIG. 5, and centers of the openings 16 are detected from the image by an image processor (not shown).

Here, the magnetic tape cartridge of this embodiment has a construction such that the top surface of the metal plate 15 is viewed from each aperture of the openings 40 provided on the bottom portion 13 of the hub 12 of the reel 10. Accordingly, the light irradiated to photograph the inside of the hub 12 reflects on the metal plate 15 and brightly photographs the inside of the detection openings 40. As a result, the detection openings 40 are clearly shown on the photographed image, and each center point of the detection openings 40 is accurately detected in a short period of time.

Because the detection openings 40 are each provided on the extension line of the rotation restriction rib groove 20B, the direction of the fitting opening 31 can be accurately detected by detecting the detection openings 40.

Based on each center of the detection openings 40 detected, a reel angle adjustment unit (not shown) performs the positioning of the reel 10. Specifically, in the reel angle adjusting unit, the positions of the detection openings 40 when the rib grooves 31A, 31B are made to correspond in direction to the ribs 20B, 20C are preset in advance as normal positions R. Based on the each center of the detection openings 40 detected, the adjusting unit computes an angle α as a deviation amount, for example, in anticlockwise direction from the normal positions R. To correct this deviation, a unit (not shown) provided at a down-stream portion of the belt conveyor rotates the reel 10 by the angle α. Consequently, the deviation of the fitting opening 31 against the release button 20 is corrected.

Then, the robot holds and inserts the release button 20 accurately prepositioned as shown in FIGS. 2, 3 and placed on the conveying pallet into the fitting opening 31 of the reel 10 prepositioned in advance. The ribs 20B, 20C of the release button 20 are fitted to the rib grooves 31A, 31B, and therewith the process of mounting the release button 20 into the hub 12 completes.

Methods for correcting the deviation of the fitting opening 31 from the supplied release button 20 include, other than the rotation of the reel 10, moving the reel 10 in the conveying and width directions of the belt conveyor. Combination of these methods may be used to ensure the correction. The deviation between the fitting opening 31 and the release button 20 supplied can also be corrected by adjusting the motion of the robot to supply the release button 20 based on the deviation amount.

As described heretofore, the magnetic tape cartridge according to the present invention has the detection openings 40 for detecting the position and direction of the reel 10, which is formed on the bottom portion 13 of the hub 12 of the reel 10, so that the top surface of the metal plate 15 are viewed from the apertures of the detection openings 40. As a result, in the process of attaching the release button 20 to the fitting opening 31, the light radiated to photograph the inside of the hub 12 reflects on the metal plate 15, and thereby the inside of the detection openings 40 is brightly photographed and the openings 40 are clearly displayed on the photographed image. Consequently, it becomes possible to accurately detect the positions of the detection openings 40 by processing the image, shorten the processing time thereof, and increase the operation accuracy and efficiency in the process of mounting the release button 20 to the fitting opening 31.

In addition, the metal plate 15 to be attracted to the magnet provided on the spindle of the drive unit on which the cartridge is to be mounted is also used as the reflection plate for brightening the inside of the detection openings 40 to photograph these openings. Therefore, the basic structure of a conventional magnetic tape cartridge can be utilized as it is without a significant modification thereof.

On the top surface of the bottom portion 13, a mark remains which was caused by an extrusion pin of the mold for extruding the injection molded reel 10 therefrom. If the mark has a smooth and glossy surface, it may become difficult to distinguish between the mark and the detection openings 40 because the mark is brightly photographed because of the reflection of light thereon when the inside of the hub 12 is photographed in the process of mounting the release button 20.

To counter this problem, in the present embodiment, the surface of the mark is provided with fine concavities and convexities to be made rough, by performing a texturing process on the tip surface of the extrusion pin. This can considerably reduce the reflection on the mark and prevent the mark from being clearly photographed when the inside of the hub 12 is photographed. As a result, it becomes possible to clearly distinguish between the detection openings 40 and the mark on the photographed image.

Although an embodiment has been described in detail above, the present invention is not limited thereto and various modifications may be made. For example, although the present embodiment uses three detection openings 40 as shown in FIG. 5, no limitation is placed on the number of the openings 40. The detection openings 40 are only required to have a positional relationship with the fitting opening 31, and may not necessarily be provided on the extension lines of the rib grooves 31A, 31B.

Further, although the present embodiment uses the release button 20 as a part for unlocking the reel 10 as shown in FIGS. 2, 3, a release pad 50 comprising: a pad body 50A with a disc shape having three arm portions 50B extending therefrom, the arm portions 50B each having an unlocking pin 50C with a columnar shape downwardly extending from the tip thereof, may also be used as in the conventional magnetic tape cartridge as shown in FIGS. 6, 7.

In this construction, in addition to the openings 16 through which the unlocking pins 50C are inserted, a detection opening is provided at a position at an inner side of the engaging portions 17 provided on the bottom portion 13 of the hub 12, so that the metal plate 15 can be viewed from the aperture of the detection opening. Accordingly, it becomes possible to clearly display the detection opening on the photographed image and accurately detect the position of the opening in a short period of time in the process of mounting the release pad 50 in the hub 12, as in the case of the magnetic tape cartridge according to the present embodiment.

Further, in the present embodiment, the texturing process is performed on the tip surface of the extrusion pin of the mold, and the pin provides a rough surface to the mark on the top surface of the bottom portion 13 of the hub 12. This considerably reduces the reflection on the mark when the inside of the hub 12 is photographed, which allows a clear distinction between the detection openings 40 and the mark on the photographed image. In stead of this construction, the detection openings 40 may be located on a circumferential line centered around the fitting opening 31, thus providing a positional relationship between the detection openings 40 and the protruding pin such that the mark is created at a position out of the circumferential line. Consequently, it becomes possible to make a clear distinction between the detection openings 40 and the mark based on the circumferential line when the inside of the hub 12 is photographed. The mark may also have an area twice or more or half or less the cross sectional area of the detection openings 40, thereby allowing clear distinction between the detection openings 40 and the mark based on the area when the inside of the hub 12 is photograph. The mark positioned out of the circumferential line on which the detection openings 40 are located, and that having an area twice or more or half or less the cross sectional area of the detection openings 40 may have the same reflection index as the openings or a rough surface with reduced reflection.

What is claimed is:

1. A magnetic tape cartridge having a release part for unlocking a reel having a magnetic tape wound therearound and housed in a locked state in a cartridge case, the release part being built in a hub having a cup shape formed on the reel, wherein a bottom portion of the hub has a fitting opening defined therein into which the release part fits in a predetermined direction, and a detection opening penetrating the bottom portion with a predetermined positional relationship with the fitting opening; and a reflection plate attached on a bottom surface of the bottom portion of the hub is viewed from an aperture of the detection opening defined in a top surface of the bottom portion of the hub.

2. A magnetic tape cartridge as claimed in claim 1, wherein a rib is protrudingly provided to a side surface of the release part and the fitting opening has a rib groove to which the rib of the release part fits; and the detection opening is defined on an extension line of the rib groove.

3. A magnetic tape cartridge as claimed in claim 2, wherein the reflection plate is the metal plate to be attracted by the magnet provided on the spindle of the drive unit when the magnetic tape cartridge is mounted to the drive unit.

4. A magnetic tape cartridge as claimed in claim 3, wherein the top surface of the bottom portion of the hub has the mark with the rougher surface than the surrounding of the mark.

5. A magnetic tape cartridge as claimed in claim 3, wherein a plurality of the detection openings are arranged on a circumferential line centered around the fitting opening, and the top surface of the bottom portion of the hub has a mark at a position out of the circumferential line.

6. A magnetic tape cartridge as claimed in claim 3, wherein the top surface of the bottom portion of the hub has the mark with the area twice or more or half or less the cross sectional area of the detection opening.

7. A magnetic tape cartridge as claimed in claim 4, wherein the side surface of the release part has a plurality of ribs including first and second ribs, the first rib having a larger engaging area with the rib groove than the second rib, the second rib being thicker than the first rib and having a smaller engaging area with the rib groove than the first rib, and the first and second ribs being alternately provided along the circumferential direction of the side surface of the release part.

8. A magnetic tape cartridge as claimed in claim 7, wherein the release part has the columnar shape, and the first and second ribs are provided at equal intervals along the circumferential surface of the release part.

9. A magnetic tape cartridge as claimed in claim 2, wherein the top surface of the bottom portion of the hub has the mark with the rougher surface than the surrounding of the mark.

10. A magnetic tape cartridge as claimed in claim 2, wherein a plurality of the detection openings are arranged on a circumferential line centered around the fitting opening, and the top surface of the bottom portion of the hub has a mark at a position out of the circumferential line.

11. A magnetic tape cartridge as claimed in claim 2, wherein the top surface of the bottom portion of the hub has the mark with the area twice or more or half or less the cross sectional area of the detection opening.

12. A magnetic tape cartridge as claimed in claim 2, wherein a side surface of the release part has a plurality of ribs including first and second ribs, the first rib having a larger engaging area with the rib groove than the second rib, the second rib being thicker than the first rib and having a smaller engaging area with the rib groove than the first rib, and the first and second ribs being alternately provided along the circumferential direction of the side surface of the release part.

13. A magnetic tape cartridge as claimed in claim 12, wherein the release part has a columnar shape, and the first and second ribs are provided at equal intervals along the circumferential surface of the release part.

14. A magnetic tape cartridge as claimed in claim 1, wherein the reflection plate is a metal plate to be attracted by a magnet provided on a spindle of a drive unit when the magnetic tape cartridge is mounted to the drive unit.

15. A magnetic tape cartridge as claimed in claim 14, wherein the top surface of the bottom portion of the hub has the mark with the rougher surface than the surrounding of the mark.

16. A magnetic tape cartridge as claimed in claim 14, wherein a plurality of the detection openings are arranged on a circumferential line centered around the fitting opening, and the top surface of the bottom portion of the hub has a mark at a position out of the circumferential line.

17. A magnetic tape cartridge as claimed in claim 14, wherein the top surface of the bottom portion of the hub has the mark with the area twice or more or half or less the cross sectional area of the detection opening.

18. A magnetic tape cartridge as claimed in claim 3, wherein the top surface of the bottom portion of the hub has a mark with a rougher surface than the surrounding of the mark.

19. A magnetic tape cartridge as claimed in claim 12, wherein a plurality of the detection openings are arranged on a circumferential line centered around the fitting opening, and the top surface of the bottom portion of the hub has a mark at a position out of the circumferential line.

20. A magnetic tape cartridge as claimed in claim 1, wherein the top surface of the bottom portion of the hub has a mark with an area twice or more or half or less the cross sectional area of the detection opening.

* * * * *